United States Patent
Zhang et al.

(10) Patent No.: US 7,904,630 B2
(45) Date of Patent: Mar. 8, 2011

(54) BUS-CONNECTED DEVICE WITH PLATFORM-NEUTRAL LAYERS

(75) Inventors: Fumin Zhang, Eden Prairie, MN (US); Chris Malakapalli, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 43 days.

(21) Appl. No.: 12/251,798

(22) Filed: Oct. 15, 2008

(65) Prior Publication Data

US 2010/0095034 A1    Apr. 15, 2010

(51) Int. Cl.
*G06F 13/00*    (2006.01)

(52) U.S. Cl. .......................................... 710/313; 711/115

(58) Field of Classification Search .......... 710/313–315; 711/115, 111, 112
See application file for complete search history.

(56) References Cited

U.S. PATENT DOCUMENTS

| | | | |
|---|---|---|---|
| 5,018,095 A | 5/1991 | Nissimov | 364/900 |
| 5,922,062 A | 7/1999 | Evoy | 710/129 |
| 7,293,261 B1 | 11/2007 | Anderson et al. | 717/136 |
| 7,349,719 B2 | 3/2008 | Buniatyan | 455/557 |
| 7,441,108 B2 * | 10/2008 | Fisher et al. | 712/227 |
| 2004/0019778 A1 * | 1/2004 | Gere | 713/2 |
| 2005/0021847 A1 | 1/2005 | Rothman et al. | 709/238 |
| 2006/0014995 A1 | 1/2006 | Velhal et al. | 71/1 |
| 2006/0259756 A1 | 11/2006 | Thompson et al. | 713/2 |
| 2006/0288168 A1 * | 12/2006 | Stevenson | 711/115 |
| 2007/0162901 A1 | 7/2007 | Oh | 717/148 |
| 2007/0180153 A1 * | 8/2007 | Cornwell et al. | 710/1 |
| 2007/0186041 A1 * | 8/2007 | Swasdee | 711/115 |
| 2007/0283114 A1 | 12/2007 | Lawrence | 711/163 |
| 2008/0005609 A1 | 1/2008 | Zimmer et al. | 714/5 |
| 2008/0010446 A1 | 1/2008 | Kim | 713/2 |
| 2008/0109617 A1 | 5/2008 | Forrer, Jr. et al. | 711/155 |

\* cited by examiner

*Primary Examiner* — Glenn A Auve
(74) *Attorney, Agent, or Firm* — Westman, Champlin & Kelly, P.A.

(57) ABSTRACT

A bus-connected device includes a data storage element, a physical layer and a controller. The data storage element stores user data and multiple adaptations for multiple platform protocols. The physical layer uses at least a portion of a selected one of the multiple platform protocols to access the user data. The controller controls and communicates with the data storage element using a controller communication protocol that is neutral relative to the multiple platform protocols.

20 Claims, 4 Drawing Sheets

BUS-CONNECTED DEVICE WITH PLATFORM-NEUTRAL LAYERS

FIELD OF THE INVENTION

The present invention relates generally to bus-connected devices, and more particularly but not by limitation to adaptation of a data storage device to a computing platform.

BACKGROUND OF THE INVENTION

Various computing platforms are known and these computing platforms use a number of variations of different chipsets, operating systems and add-on hardware. Designing disc drives and other storage devices is difficult because of the large number of platform variations. Typically, an interface for the data storage device requires developing different software for each variation. The software development is time-consuming, expensive and redundant.

Embodiments of the present invention provide solutions to these and other problems, and offer other advantages over the prior art.

SUMMARY OF THE INVENTION

In the embodiments described below, a bus-connected device comprises a data storage element. The data storage element stores user data. The data storage element stores multiple adaptations for multiple platform protocols.

The bus-connected device comprises a physical layer. The physical layer uses at least a portion of a selected one of the multiple platform protocols to access the user data.

The bus-connected device comprises a controller. The controller controls the data storage element. The controller communicates with the data storage element using a controller communication protocol. The controller communication protocol is neutral relative to the multiple platform protocols.

Other features and benefits that characterize embodiments of the present invention will be apparent upon reading the following detailed description and review of the associated drawings.

BRIEF DESCRIPTION OF THE DRAWINGS

FIG. 1 illustrates a block diagram (abstraction) of a first system that interfaces between a bus-connected device and a computing platform.

FIG. 2 illustrates a block diagram of a second system that interfaces between a bus-connected device and a computing platform.

FIG. 3 illustrates a block diagram of a third system that interfaces between a bus-connected device and a computing platform.

FIG. 4 illustrates an embodiment of a disc drive.

DETAILED DESCRIPTION OF ILLUSTRATIVE EMBODIMENTS

In the embodiments described below, a system adapts a bus-connected device to a host platform. The system includes the bus-connected device. The bus-connected device comprises a data storage element. The data storage element stores user data. The data storage element stores multiple adaptations of multiple platform protocols that adapt the bus-connected device for interfacing with multiple host platforms. The bus-connected device comprises a controller. The controller controls the data storage element. The controller communicates with the data storage element using a controller communication protocol that is neutral relative to the multiple platform protocols. A host platform couples to the bus-connected device by a bus. The host platform receives at least a portion of a selected one of the multiple adaptations that corresponds with a chipset in the host platform.

FIG. 1 illustrates a block diagram (abstraction) of a system 100 that interfaces between a data storage device (not illustrated in FIG. 1) and a computing platform (not illustrated in FIG. 1). The system 100 comprises commands and data that can be realized in hardware, firmware, software or, preferably, a combination of hardware, firmware and software. The data storage device can comprise a disc drive, electrically erasable programmable read only memory (EEPROM), a solid state disk, or other known types of solid state memory or data storage devices. As described in more detail below in connection with FIGS. 2 and 3, the system 100 preferably resides partially in the data storage device, and partially in the computing platform.

The system 100 comprises a core driver 102. The core driver 102 communicates with a data storage element (not illustrated in FIG. 1). The core driver 102 communicates with the data storage element in a format that is associated with formatting of data in the data storage element.

In an example in which the data storage element comprises one or more magnetic data storage discs in a disc drive, the core driver 102 comprises a controller communication protocol for communicating with the data storage element. The controller communication protocol is invariant as a function of a selected platform protocol. The controller communication protocol for communicating with the magnetic data storage discs includes disc drive format features such as seeking and tracking modes, preambles for synchronization, error detection and correction coding, sector numbers, cylinder numbers, physical addresses and the like. The core driver 102 in the controller controls the data storage element as a function of the selected platform protocol. The controlling of the data storage element is adapted to the selected platform protocol, however, the communication protocol used in controlling is invariant as a function of the platform protocol.

The system 100 comprises an operating system (OS) abstraction layer 104, a feature manager abstraction layer 106, and an interface abstraction layer 108. The core driver 102 communicates with the OS abstraction layer 104 along lines 110 and 112. The core driver 102 communicates with the feature manager abstraction layer 106 along line 114. The core driver 102 communicates with the interface abstraction layer 108 along lines 116. The communications of the core driver 102 along lines 110, 112, 114, 116 are communications that are formatted to be platform neutral communications. The term "platform neutral communication" as used in this application means communication that is formatted such that it is free of higher level layers of formatting which are different for different operating systems. Platform neutral communication is invariant as a function of the selected platform. According to one aspect, platform neutral communication comprises formatting that is free of layers that are PC-specific or MAC specific. According to another aspect, platform neutral communication comprises formatting that is free of layers of formatting that are Windows-specific, OS/10 specific or UNIX specific. According to another aspect, platform neutral communication comprises formatting that is at a low enough level (in the sense of lower and higher levels of a multilayer communication protocol) and complete enough so that the platform neutral communication can be readily converted by commands into communications that are platform specific and operating system specific. According to yet another aspect, platform neutral communication does not include a complete presentation layer or a complete application layer for a particular operating system.

Figure 1:
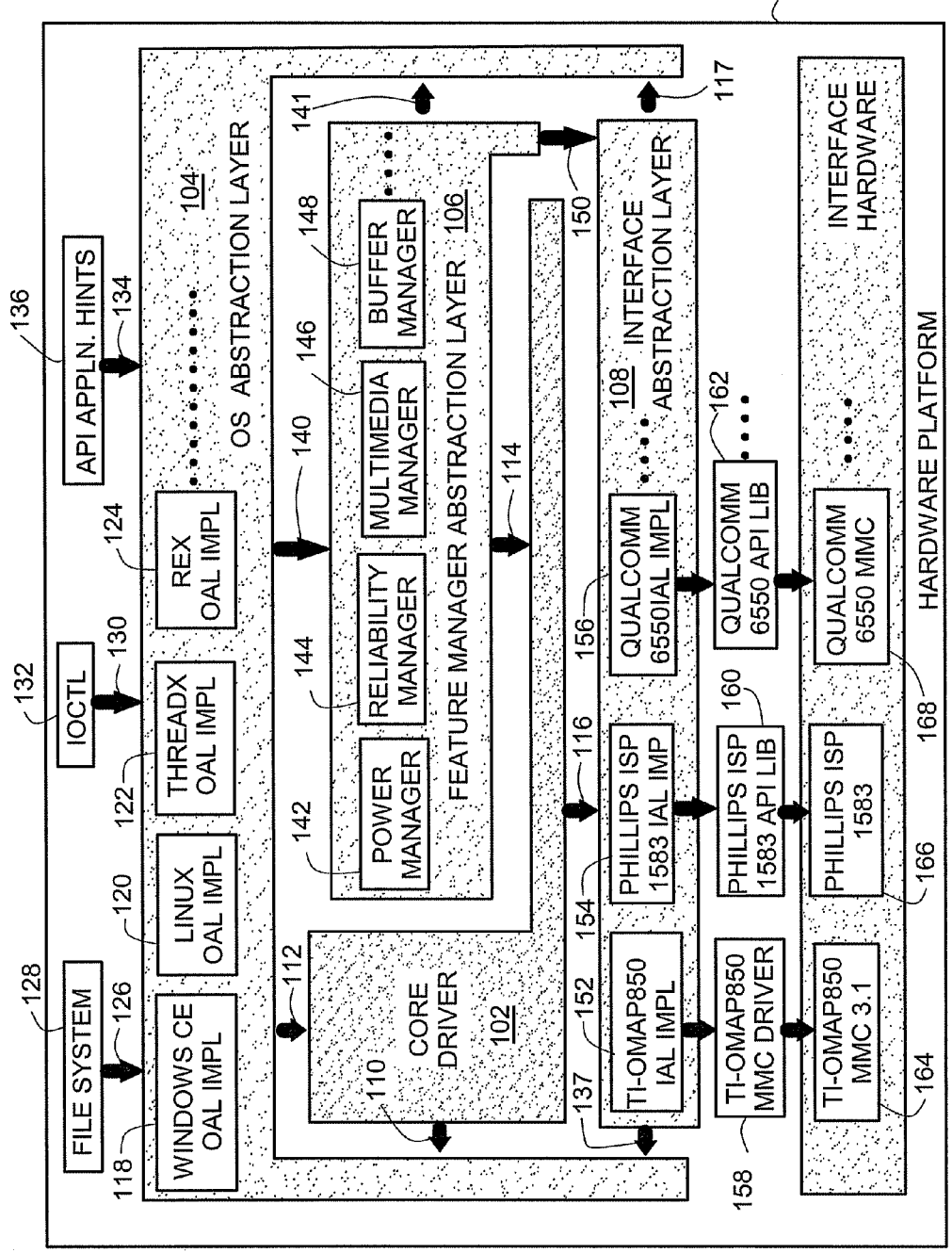

The operating system abstraction layer 104 is configurable and is configured to access one of a library of different original equipment manufacturer (OEM) adaptation layers (OAL's) 118, 120, 122, and 124. The particular OAL's 118, 120, 122, 124 illustrated in FIG. 1 are exemplary, and different OAL's can also be used. An OAL is selected that is associated with a selected operating system with which the data storage device is used. The operating system abstraction layer 104 communicates along line 126 with a file system 128 associated with the selected operating system. The operating system abstraction layer 104 communicates along line 130 with a selected user-to-kernel interface (input/output control "IOCTL") 132 associated with the selected platform and operating system. The operating system abstraction layer 104 communicates along line 134 with application programming interface (API) hints (API APPLN HINT) 136 that are selected for use with the selected platform and operating system. The operating system abstraction layer 104 communicates along lines 117, 137 with the interface abstraction layer 108.

The feature manager abstraction layer 106 communicates along lines 140, 141 with the OS abstraction layer 104. The feature manager abstraction layer 106 communicates along line 150 with the interface abstraction layer 108. The feature manager abstraction layer 106 accesses at least one of a library of data storage device managers such as a power manager 142, a reliability manager 144, a multimedia manager 146 and a buffer manager 148, and makes these managers available for managing the data storage element. The managers 142, 144, 146, 148 illustrated in FIG. 1 are exemplary, and different managers may also be used. The data storage device managers 142, 144, 146, 148 are specialized to the data storage element, are platform neutral, are not specialized to any particular operating system or platform, and are available for use in conjunction with multiple platforms and protocols.

The interface abstraction layer 108 accesses at least one of a library of specific interface abstraction layer (IAL) implementations 152, 154, 156. Each specific IAL implementation 152, 154, 156 is associated with and communicates with a corresponding specific application programming interface (API) driver 158, 160, 162. Each specific API drivers 158, 160, 162 is associated with and drives a specific hardware device 164, 166, 168. The communications between each specific IAL implementation and each API implementation is hardware device specific, and is not platform neutral. The IAL, API driver and hardware device implementations illustrated in FIG. 1 are exemplary, and other IAL, API driver and hardware device implementations can be used.

A data storage device that includes the system 100 can be used with a variety of different platforms and operating systems without the need to provide user-actuated mechanical switches or jumpers and without the need to provide multiple platform-specific or operating system-specific circuit cards for use with the data storage device. Examples implementations in data storage devices are described in more detail below in connection with FIGS. 2-3. The data storage device illustrated in FIG. 1 is exemplary, and other bus-connected devices can be used as well.

Figure 2:
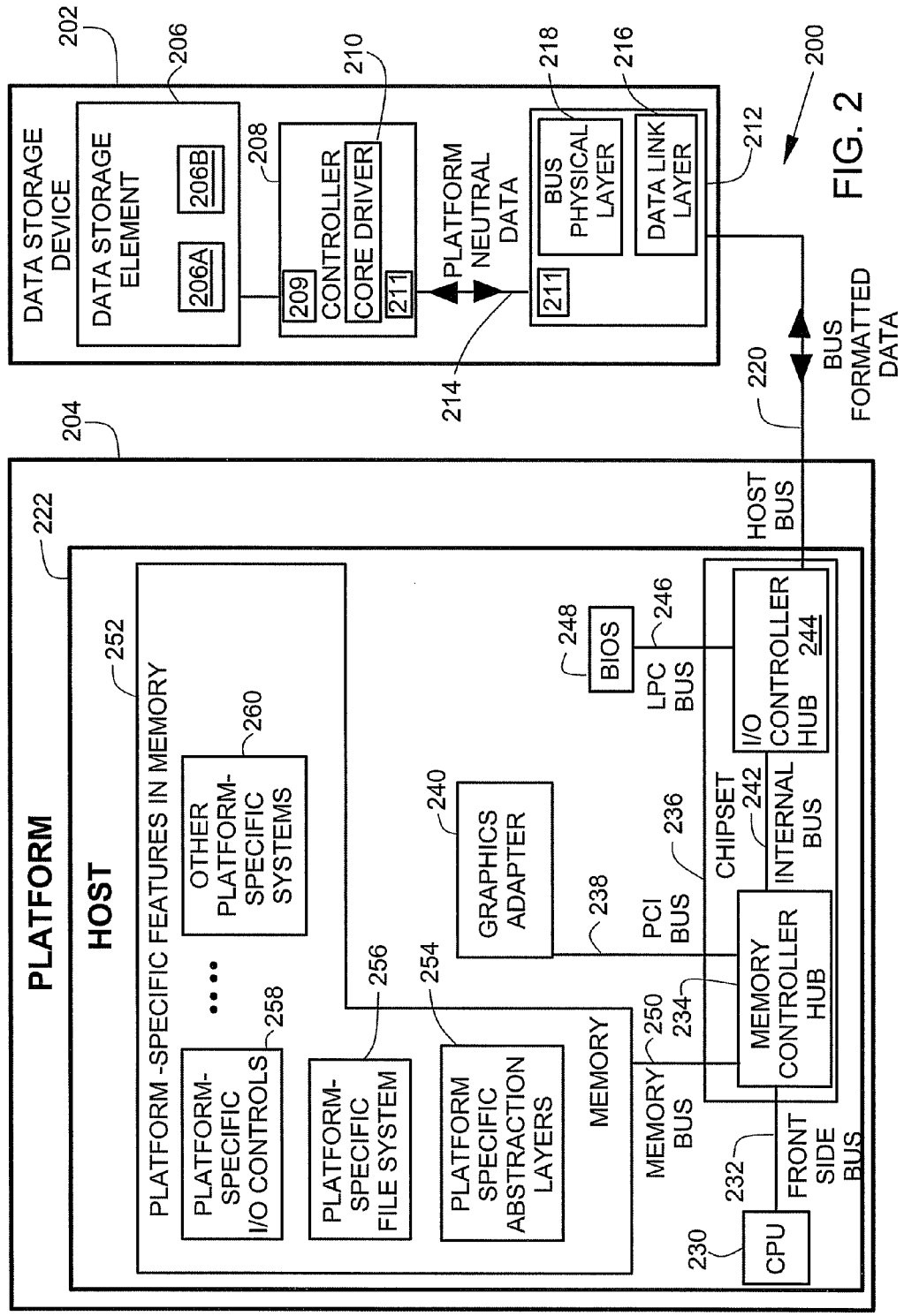

FIG. 2 illustrates a block diagram of a system 200 that interfaces between a data storage device 202 and a computing platform 204. The system 200 comprises commands and data that can be realized in hardware, firmware, software or, preferably, a combination of hardware, firmware and software.

The data storage device 202 comprises a data storage element 206. According to one aspect, the data storage device 202 comprises a disc drive, and the data storage element 206 comprises one or more magnetic data storage discs and one or more read/write heads. The data storage element 206 stores user data 206A and multiple adaptations 206B for multiple platform protocols.

The system 200 comprises a controller 208 that includes a core driver 210. The core driver 210 communicates with the data storage element 206. The core driver 210 communicates with the data storage element 206 in a controller communication format (controller communication protocol) 209 that is associated with formatting of data in the data storage element 206.

The controller communication protocol 209 is invariant as a function of a selected platform protocol for the platform 204. The controller communication protocol 209 for communicating with the data storage element 206 includes disc drive format features such as seeking and tracking modes, preambles for synchronization, error detection and correction coding, sector numbers, cylinder numbers, physical addresses and the like. The core driver 210 in the disc drive controller controls the data storage element 206 as a function of the selected platform protocol. The controlling of the data storage element 206 is adapted to the selected platform protocol, however, the controller communication protocol 209 used in the controlling the data storage element 206 is invariant as a function of the platform protocol. The controller communication protocol 209 includes a large set of controller commands so that enough commands are included to accommodate any selected one of multiple platforms.

The data storage device 202 comprises a bus interface circuit 212. The bus interface circuit 212 communicates along line 214 with the controller 208. Communication along line 214 comprises platform neutral communication protocol 211. The platform neutral communication protocol 211 is shared by the controller 208 and the bus interface circuit 212. The bus interface 212 comprises lower levels of a bus communication protocol such as a bus data link layer 216 and a bus physical layer 218. The bus interface 212 communicates along a communication bus 220 with a host 222 that is running on platform 204. Communication along communication bus 220 comprises platform neutral communication. Communication along bus 220 does not include higher level layers of bus communication that include platform-specific or host-specific aspects. The data storage device 202 is thus connectable by the communication bus 220 to different platform types and host types without the need for any physical adaptation of the data storage device 202 such as actuation of mechanical switches, installation of jumpers or installation of a circuit board.

The host 222 comprises a central processor unit (CPU) 230. The processor 230 communicates along a front side bus 232 with a memory controller hub 234 that is part of a chipset 236. The memory controller hub 234 communicates along a peripheral component interconnect (PCI) bus 238 with a graphics adapter 240. The memory controller hub 234 communicates along an internal bus 242 in the chipset with an input-output (I/O) controller hub 244. The I/O controller hub 244 communicates along a low pin count (LPC) bus 246 with a basic input/output systems (BIOS) circuit 248. The I/O controller hub 244 communicates along the communication bus 220 with the data storage device 202. The hardware configuration of the host 222 is exemplary, and other hardware configurations can be used as well.

The memory controller hub 234 communicates along a memory bus 250 with memory 252. Platform-specific software such as platform specific abstraction layers 254, a platform-specific file system 256, platform specific I/O controls 258 and other platform-specific software 260 is loaded into the memory 252. According to one aspect, the platform specific software 254, 256, 258, 260 is specific to the type of platform 204 and the type of host 222. According to another aspect, at least a portion of the platform specific software 254, 256, 258, 260 is specific to the type of chipset 236. According to another aspect, the set 206B of platform specific software for multiple platforms, operating systems and chipsets is stored in the data storage element 206, and at a time of startup of the data storage device 202 by the host 204, a single one of the set of platform specific software is selected for use and loaded into memory 252 on the host 222 at startup. The data storage device illustrated in FIG. 2 is exemplary, and other bus-connected devices can be used as well.

Figure 3:
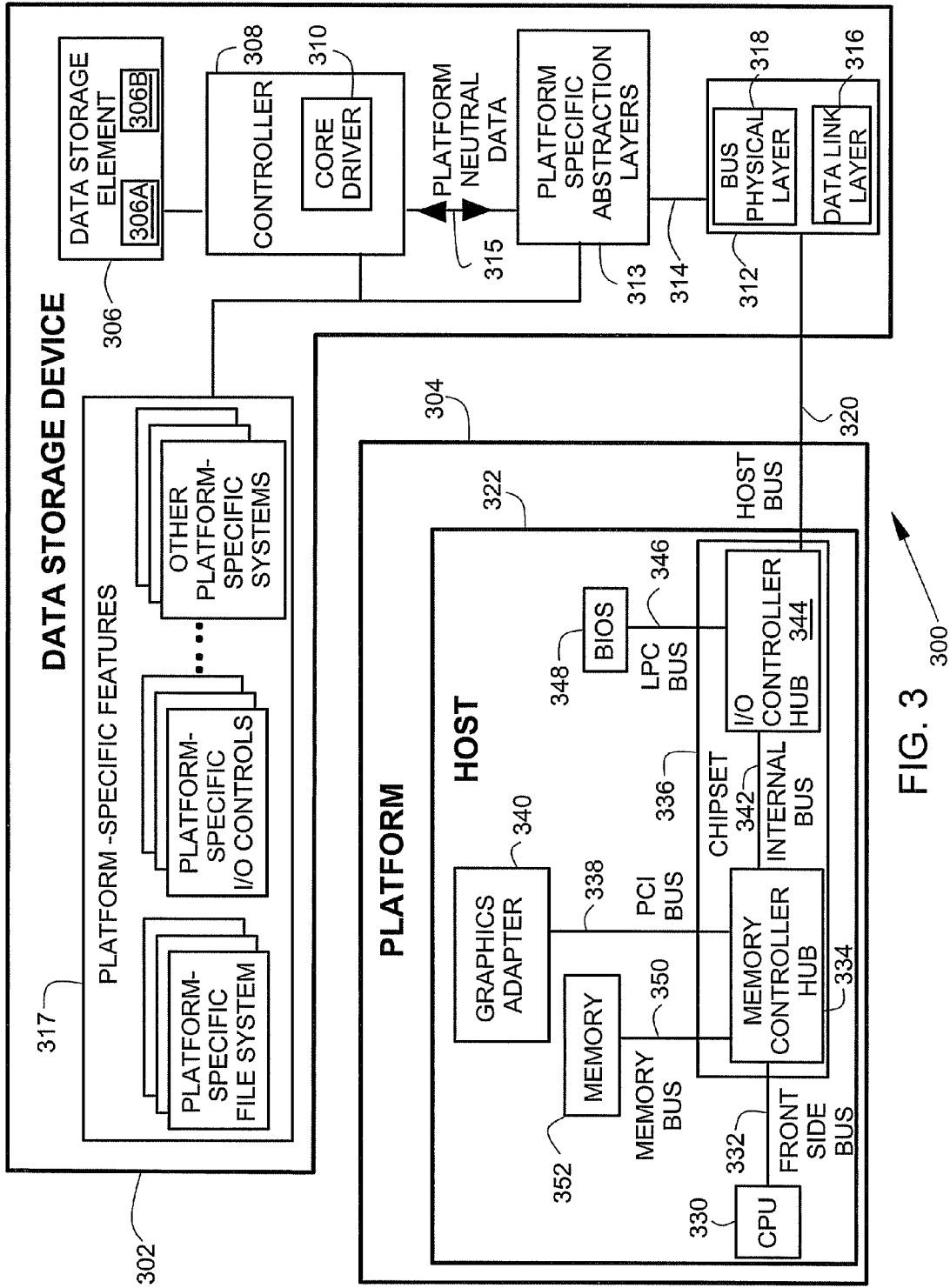

FIG. 3 illustrates a block diagram of a system 300 that interfaces between a data storage device 302 and a computing platform 304. The system 300 comprises commands and data that can be realized in hardware, firmware, software or, preferably, a combination of hardware, firmware and software. The data storage device 302 comprises a data storage element 306. According to one aspect, the data storage device 302 comprises a disc drive, and the data storage element 306 comprises one or more magnetic data storage discs and one or more read/write heads. The data storage element 306 stores user data 306A and multiple adaptations 306B for multiple platform protocols. A controller 308 loads a selected one of the multiple adaptations 306B into RAM as platform specific features 317 for use.

The system 300 comprises the controller 308 that includes a core driver 310. The core driver 310 communicates with the data storage element 306. The core driver 310 communicates with the data storage element 306 in a controller communication protocol that is associated with formatting of data in the data storage element 306 (similar that described above in connection with FIG. 2).

The controller communication protocol is invariant as a function of a selected platform protocol for platform 304. The controller communication protocol for communicating with the data storage element 306 includes disc drive format features such as seeking and tracking modes, preambles for synchronization, error detection and correction coding, sector numbers, cylinder numbers, physical addresses and the like. The core driver 310 in the disc drive controller controls the data storage element 306 as a function of the selected platform protocol. The commands selected to control the data storage element 306 are a subset of commands of the controller communication protocol which are appropriate for the selected platform protocol. The controller communication protocol used in the controlling the data storage element 306, however, is invariant as a function of the platform protocol.

The data storage device 302 comprises a bus interface circuit 312 and platform specific abstraction layers 313. The bus interface circuit 312 communicates along line 314 with the platform specific abstraction layers 313. The platform specific abstraction layers 313 communicate along line 315 with the controller 308. Communication along line 315 comprises communication that is formatted with a platform neutral communication protocol. The bus interface 312 comprises lower levels of a bus communication protocol such as a bus data link layer 316 and a bus physical layer 318. The bus interface 312 communicates along a communication bus 320 with a host 322 that is running on the platform 304. Communication along communication bus 320 comprises platform specific communication. Communication along bus 320 includes higher level layers of bus communication that include platform-specific or host-specific aspects. The data storage device 302 is connectable by the communication bus 320 to different platform types and host types without the need for any adaptation of the data storage device 302 to the host or platform other than selection of one set of platform specific abstraction layers 313 for use. A set of multiple platform specific features 317 is stored in the data storage device 302, and the one set of platform specific abstraction layers 313 that are in use are selected from the set 317. According to one aspect, the set 317 is stored in the data storage element 306. According to another aspect, the set 317 is stored in read only memory (ROM).

The host 322 comprises a central processor unit (CPU) 330. The processor 330 communicates along a front side bus 332 with a memory controller hub 334 that is part of a chipset 336. The memory controller hub 334 communicates along a peripheral component interconnect (PCI) bus 338 with a graphics adapter 340. The memory controller hub 334 communicates along an internal bus 342 in the chipset 336 with an input-output (I/O) controller hub 344 in the chipset 336. The I/O controller hub 344 communicates along a low pin count (LPC) bus 346 with a basic input/output systems (BIOS) circuit 348. The I/O controller hub 344 communicates along the communication bus 320 with the data storage device 302. The memory controller hub 334 communicates along a memory bus 350 with memory 352. The data storage device illustrated in FIG. 3 is exemplary, and other bus-connected devices can be used as well.

Figure 4:
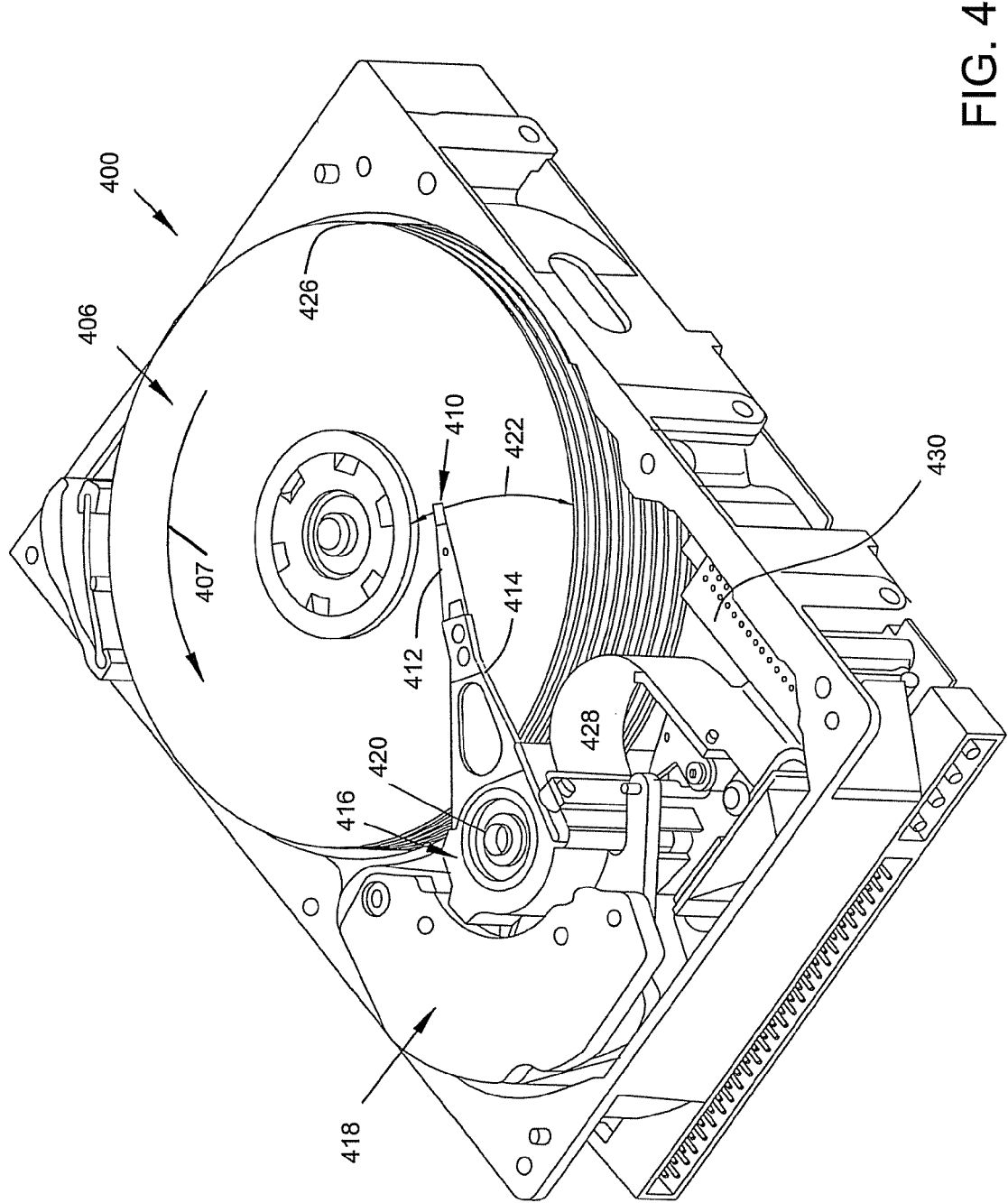

In FIG. 4, an embodiment of a disc drive 400 is illustrated. Disc drive 400 includes a pack of multiple discs 426 having storage surfaces 406 that are typically layers of magnetic material. The disc drive 400 also includes a head gimbal assembly (HGA) 412 that includes a read/write head 410 for each stacked disc. The head gimbal assembly 412 is attached to an arm 414 of a voice coil motor 418. The pack of discs 426 is spun or rotated as shown by arrow 407 to allow the head-gimbal assembly 412 to access different rotational locations for data on the storage surfaces 406 of the discs 426.

The head gimbal assembly 412 is actuated to move radially, relative to the discs 426, as shown by arrow 422 to access different radial locations for data on the storage surfaces 406 of discs 426. Typically, the actuation of head gimbal assembly 412 is provided by the voice coil motor 418. Voice coil motor 418 includes a rotor 416 that pivots on axle 420. The arm 414 actuates the head gimbal assembly 412. Disc drive 400 includes electronic circuitry 430 for controlling the operation of the disc drive and transferring data in and out of the disc drive. The pack of discs 426 and the read/write heads, taken together comprise a data storage element that is controlled by a disc controller portion of the electronic circuitry 430. User data and multiple adaptations for multiple platform protocols are stored on the pack of disc 426.

Aspects of the system abstraction shown in FIG. 1 are useful in the systems illustrated in FIGS. 2-4. It is to be understood that even though numerous characteristics and advantages of various aspects have been set forth in the foregoing description, together with details of the structure and function of various aspects, this disclosure is illustrative only, and changes may be made in detail, especially in matters of structure and arrangement of parts to the full extent indicated by the broad general meaning of the terms in which the appended claims are expressed. For example, the particular elements may vary depending on the particular application for the data storage device while maintaining substantially the same functionality. In addition, although the preferred aspects described herein is directed to a data storage device for connection to a personal computer, it will be appreciated by those skilled in the art that the teachings herein can be applied to other computing devices.

What is claimed is:

1. A bus-connected device, comprising:
    a data storage element that stores user data and multiple adaptations for multiple platform protocols;
    multiple devices, each configured to use at least a portion of a selected one of the multiple platform protocols to access the user data; and
    a controller that controls the data storage element, and that communicates with the data storage element using a controller communication protocol that is neutral relative to the multiple platform protocols.

2. The bus-connected device of claim 1 wherein the controller communication protocol is invariant as a function of the selected platform protocol.

3. The bus-connected device of claim 1 wherein the controller controls the data storage element as a function of the selected platform protocol.

4. The bus-connected device of claim 1 wherein the selected one of the multiple platform protocols comprises:
    an interface abstraction layer that communicates with the multiple devices using the selected platform protocol, and that communicates with the controller.

5. The bus-connected device of claim 1 wherein at least one of the multiple platform protocols comprises:
    a feature manager abstraction layer.

6. The bus-connected device of claim 5 wherein the abstraction layer comprises:
    a platform-specific host bus adaptation.

7. The bus-connected device of claim 5 wherein the bus-connected device comprises a data storage device.

8. The bus-connected device of claim 1 wherein at least one of the multiple platform protocols comprises:
    an operating system abstraction layer.

9. The bus-connected device of claim 1 wherein at least one of the multiple platform protocols comprises:
    a core driver layer that includes the controller.

10. The bus-connected device of claim 1 wherein at least one of the multiple adaptations comprises:
    a platform-specific operating system adaptation.

11. A method, comprising:
    storing user data and multiple adaptations for multiple platform protocols in a data storage element of a bus-connected device;
    accessing the user data using one of a plurality of hardware devices in a physical layer of the bus-connected device and at least a portion of one of the multiple platform protocols;
    controlling the data storage element with a controller in the bus-connected device, and
    communicating with the data storage element using a controller communication protocol that is neutral relative to the multiple platform protocols.

12. The method of claim 11 wherein the controller communication protocol is invariant as a function of the selected platform protocol.

13. The method of claim 11 wherein the controller is controlling the data storage element as a function of the selected platform protocol.

14. The method of claim 11 wherein at least one of the multiple adaptations comprises:
    a platform-specific operating system adaptation.

15. The method of claim 11 wherein the abstraction layer comprises:
    a platform-specific host bus adaptation.

16. The method of claim 11 wherein the bus-connected device comprises a data storage device.

17. A system of adapting a bus-connected device to a host platform, comprising:
    a bus-connected device comprising a data storage element that stores user data and multiple adaptations of multiple platform protocols that adapt the bus-connected device for interfacing with multiple host platforms, the bus-connected device comprising a controller that controls the data storage element and that communicates with the data storage element using a controller communication protocol that is neutral relative to the multiple platform protocols; and
    a host platform coupled to the bus-connected device by a bus, the host platform receiving a selected one of the multiple adaptations that corresponds with a chipset in the host platform.

18. The system of claim 17 wherein the selected one of the multiple adaptations corresponds with an operating system running on the platform.

19. The system of claim 18 wherein the data storage element comprises a magnetic recording disc and read/write head.

20. The system of claim 18 wherein the data storage element comprises a solid state memory.

* * * * *